United States Patent
Shannon

[11] Patent Number: 6,153,238
[45] Date of Patent: Nov. 28, 2000

[54] PACKAGED DECORATOR CHEESE PRODUCT WITH CAP

[75] Inventor: Daniel P. Shannon, Green Bay, Wis.

[73] Assignee: Schreiber Foods, Inc., Green Bay, Wis.

[21] Appl. No.: 09/299,220

[22] Filed: Apr. 22, 1999

[51] Int. Cl.$^7$ .......................... B65D 85/72; B65D 85/76
[52] U.S. Cl. .......................... 426/115; 426/413; 426/394; 426/516; 426/517; 222/92; 222/107; 425/461; 220/789
[58] Field of Search .................. 426/81, 87, 389, 426/394, 413, 512, 582, 516, 115, 517, 130; 222/92, 107, 519, 520.21, 549, 554; 425/461–67; 220/229, 787, 789, 790, 801, 802

[56] References Cited

U.S. PATENT DOCUMENTS

| | | |
|---|---|---|
| 891,109 | 6/1908 | Speece . |
| 2,320,496 | 6/1943 | Wechsler .................... 222/107 |
| 2,723,779 | 11/1955 | Parker et al. .............. 222/107 |
| 3,121,310 | 2/1964 | Rice . |
| 3,162,411 | 12/1964 | Duggan . |
| 3,285,479 | 11/1966 | Porter et al. .............. 222/521 |
| 3,477,614 | 11/1969 | Runge .................... 426/115 |
| 3,494,496 | 2/1970 | Livingstone . |
| 3,693,831 | 9/1972 | West .................... 220/232 |
| 3,847,523 | 11/1974 | Parrish et al. .............. 425/191 |
| 4,177,620 | 12/1979 | Daly et al. ................ 53/425 |
| 4,387,820 | 6/1983 | Ignell . |
| 4,452,823 | 6/1984 | Connolly et al. .......... 426/115 |
| 4,844,917 | 7/1989 | DeLorimiere .............. 426/87 |
| 4,869,915 | 9/1989 | Inayoshi et al. .......... 426/565 |
| 4,961,517 | 10/1990 | Tkac .................... 222/94 |
| 5,044,530 | 9/1991 | Stull .................... 222/521 |
| 5,103,990 | 4/1992 | Irwin . |
| 5,312,189 | 5/1994 | Aeschbach et al. . |
| 5,472,482 | 12/1995 | Willits et al. .............. 106/2 |
| 5,495,958 | 3/1996 | Konrad et al. . |
| 5,508,051 | 4/1996 | Falla et al. .............. 426/392 |
| 5,538,050 | 7/1996 | Galdon .................. 141/10 |
| 5,552,117 | 9/1996 | Burns . |
| 5,560,885 | 10/1996 | Murschall et al. ........ 264/469 |
| 5,636,757 | 6/1997 | Porvanznik .............. 215/364 |

FOREIGN PATENT DOCUMENTS 0340132   4/1988   European Pat. Off. ............ 426/115

OTHER PUBLICATIONS

Martha Stewart's Hor D'oeuvres Handbook copyright 1999, Chapter 10 recipes previously published pp. 479, pp. 152–153.

Schreiber Foods, Inc., Ready–Cut Select Cheese, 2–page brochure, undated, but published prior to Apr. 22, 1998.

Rich's On Top™ Non–Dairy Dessert Topping package, 1992.

*Primary Examiner*—Milton Cano
*Assistant Examiner*—Sherry A. Dauerman
*Attorney, Agent, or Firm*—Steven P. Shurtz; Brinks Hofer Gilson & Lione

[57] ABSTRACT

A packaged cheese product comprises a hermetically sealed container, preferably a pouch, made out of flexible material; a decorator tip or adaptor therefor inside the container, a cheese product inside the container and a cap for closing the decorator tip when the pouch is partially emptied. The cheese product can be extruded after cuffing the corner off of the pouch and seating the decorator tip in the resulting opening. Cheese in decorative shapes can then be easily applied as a garnish on food items and the pouch can then be reclosed by capping the decorator tip. The cap preferably has a bulb member that fits inside the decorator tip and a skirt member that fits around the outside petals of the preferred decorator tip.

14 Claims, 4 Drawing Sheets

PACKAGED DECORATOR CHEESE PRODUCT WITH CAP

BACKGROUND OF THE INVENTION

The present invention relates to cheese products, and particularly to a novel packaged cheese product which can be used to extrude the cheese product into decorative shapes, the package having a cap to close a decorator tip affixed to partly emptied packages.

As used herein, the term "cheese product" includes a wide variety of edible compositions, including natural cheeses, cold pack cheeses, processed cheeses, imitation cheeses and products made primarily from the foregoing. Examples of natural cheese include cheddar and colby cheeses, as well as cream cheese and Neufchatel cheese. Examples of cold pack cheeses include cold pack cheese and cold pack cheese food. Examples of processed cheeses include pasteurized process cheese, pasteurized process cheese food, pasteurized process cheese spread, pasteurized process cheese product and cheese sauce. Many of these cheese products have standards of identity specified in Part 133 of Title 21 of the Code of Federal Regulations. For purposes of generalization, and as relevant to the present invention, cold pack cheeses and processed cheeses are both cheese products in which one or more natural cheeses have been comminutated and mixed into a homogeneous mass. Processed cheeses have been cooked to a pasteurization temperature and generally include the addition of emulsifying agents. On the other hand, cold pack cheeses have been comminutated and mixed without the aid of heat, and do not include the addition of emulsifying agents.

Cheese products have long been used as not only food items by themselves, but also as a garnish applied to other food items, such as cheese and crackers.

Chefs often prepare hors d'oeuvres by taking a cold pack cheese, softening it by beating it in a mixer, and loading it into a pastry bag fitted with a decorator tip. In a process known as "piping," the cheese is forced out of the pastry bag to form decorative shapes on food items. Chefs often add flavorings to the cold pack cheese used for this purpose. Cream cheese and Neufchatel cheese are sometimes used for garnishing food items in this same manner. However, it is sometimes difficult to obtain a proper consistency such that the cheese product can be extruded out of the pastry bag yet retain its decorative shape for as long as it takes for the decorated food item to be served and consumed. Furthermore, if more cheese is prepared than needed, the cheese may be wasted as it is difficult to close up the pastry bag.

In other situations, particularly involving franchises, chain restaurants or other food service settings where quality uniformity is important, kitchen workers who make up flavored cheese products which are served as a garnish may have difficulty in preparing cheese products with consistent flavor or other qualities. This problem is inherent whenever cheese products are made in batches at different times or at different locations, especially by kitchen workers who are not highly trained. Again, saving leftover product is a problem since pastry bags and decorator tips are not designed for reclosing and storage.

A number of processed cheese products have been marketed in forms that are suited for garnishing other food items with cheese. Some soft cheese products are sold in wide-mouth containers so that they can be scooped out, such as on a celery stick. Others are packaged in containers from which they are extruded through an opening that provides a decorative shape to the cheese product. For example Easy Cheese® is a pasteurized process cheese spread sold in an aerosol can. When the tip of the can is flexed, the pasteurized process cheese spread is forced out of the can through a nozzle that has slits in the side. The cheese product can thus be extruded onto crackers or other food items in a decorative shape.

A similar product packaged in a chub pack was commercially sold under the trade name "Squeeze-a-snak." A chub pack is a cylindrical package, usually of a heavy gauge packaging film, with its ends gathered and held by a metal clip. As best understood, the "Squeeze-a-snak" product was a pasteurized process cheese spread. The side wall of the chub pack had a hole with a fitment in it that was initially sealed. Once opened some petal-like member in the fitment made contours in the pasteurized process cheese spread forced out of the hole. The chub pack contained about 6 oz. of pasteurized process cheese spread.

Recently, microwaveable plastic bottles containing a pasteurized process cheese sauce have been introduced. These products are designed to allow consumers to squeeze a flowable cheese sauce onto other foods, such as hot dogs, corn chips and the like. The cheese sauce in such products is extruded in a round stream, and does not maintain any particular shape.

One drawback of Easy Cheese® is that it is expensive, and each can contains a relatively small quantity of cheese. The same was true for the "Squeeze-a-snak" product. Thus they were designed for immediate snack consumption, and are unsuitable for food service or institutional usages. Also, both products were pasteurized process cheese spreads. Many people would rather not use processed cheese as a garnish. Further, because the Easy Cheese® can is not flexible, the rate at which the product is expelled from the can is mostly beyond the user's control. If the propellant in the can is used up before all of the product is expelled, product remaining in the can is wasted.

There has been a long felt need for an improvement to these prior art cheese products. In the case of the pastry bag used by the chef, the time it takes to make up a softened batch of cheese and load it into the pastry bag adds to the expense of the final food item. Also, any unused cheese is often wasted because once mixed and placed in a pastry bag, it would be difficult to seal the bag and unsanitary to store it for any useful length of time. Further, the pastry bag must be cleaned after use, which is not an easy task, and often results in misplacement and loss of the decorator tip.

A packaged cheese product was developed to meet these needs. However, the cheese product in such packages is frequently not used completely, and partially emptied packages are then stored. It would be a great benefit if such packaged cheese products could be closed with a tight fitting cap.

SUMMARY OF THE INVENTION

A packaged cheese product has been invented which allows a caterer, chef or other food preparer to easily and quickly add decorative cheese to food items and then easily cap the decorator tip until the product is used again. In one aspect, the invention is a cap for closing a decorator tip having petals with slots between them comprising a skirt member having a generally frustoconical inside surface; a generally spherical bulb member within the skirt member, the bulb member being sized to fit within the decorator tip; and the skirt member and bulb member defining a space therebetween in which the petals of the decorator tip may be held, the skirt covering the slots between the petals to thereby close the decorator tip.

In a second aspect, the invention is a food package with a decorator tip and cap comprising a container comprising flexible material; a food product within the container; a decorator tip having a decorator opening for extruding the food product out of the opening in a decorator shape; and a cap on the decorator tip closing said opening, the cap and tip being coupled together and both inside of said container.

In another aspect, the invention is a packaged decorator cheese product comprising a container comprising flexible material; a decorator tip attached to the container, the tip having flexible petals; a cheese product inside the container; and a cap having a rigid bulb member and a skirt member, the bulb member being sized to fit inside the tip and the skirt member covering the outside of the petals. In still another aspect, the invention is a method of opening a food container and reclosing the container after dispensing food in decorative shapes therefrom comprising the steps of providing a container made of flexible material with a food product and a decorator tip inside of the container; making an opening in the container and forcing the decorator tip so that a front end thereof protrudes out of the container opening, the decorator tip having a back end that keeps the decorator tip from being expelled out of the opening; forcing the food product out of an opening through the decorator tip so that the food product is formed into a decorator shape; and capping the opening of the decorator tip with a cap that has a bulb member that fits within the decorator tip opening.

Preferably a cold pack cheese, cream cheese based product or Neufchatel cheese based product is used in the pouch. Most preferably a cold pack cheese food or a Neufchatel cheese based product is used. The cheese product prepackaged in a flexible pouch allows the chef or other food preparers to easily add decorative cheese as a garnish to food items. With the preferred embodiment of the invention, a chef simply removes the sealed pouch from the refrigerator, kneads the cheese for a few minutes, cuts the corner of the pouch, directs the capped decorator tip to slide into the open corner of the pouch, uncaps the tip, and then proceeds to decorate the food items with the cheese product. The chef does not have to mix a cheese product to the correct consistency and put it in a pastry bag. The preferred cheese product has the proper consistency so that it can be extruded into decorative shapes and the cheese will retain its shape throughout the catering process. There is no clean up, as the pouch and decorator tip are disposable. Alternatively, if the pouch is not empty, the cap is replaced on the tip and the capped pouch is stored in the refrigerator until it is needed again.

These and other advantages of the invention, as well as the invention itself, will be best understood in view of the attached drawings.

DETAILED DESCRIPTION OF THE DRAWINGS AND PREFERRED EMBODIMENT OF THE INVENTION

Figure 1:
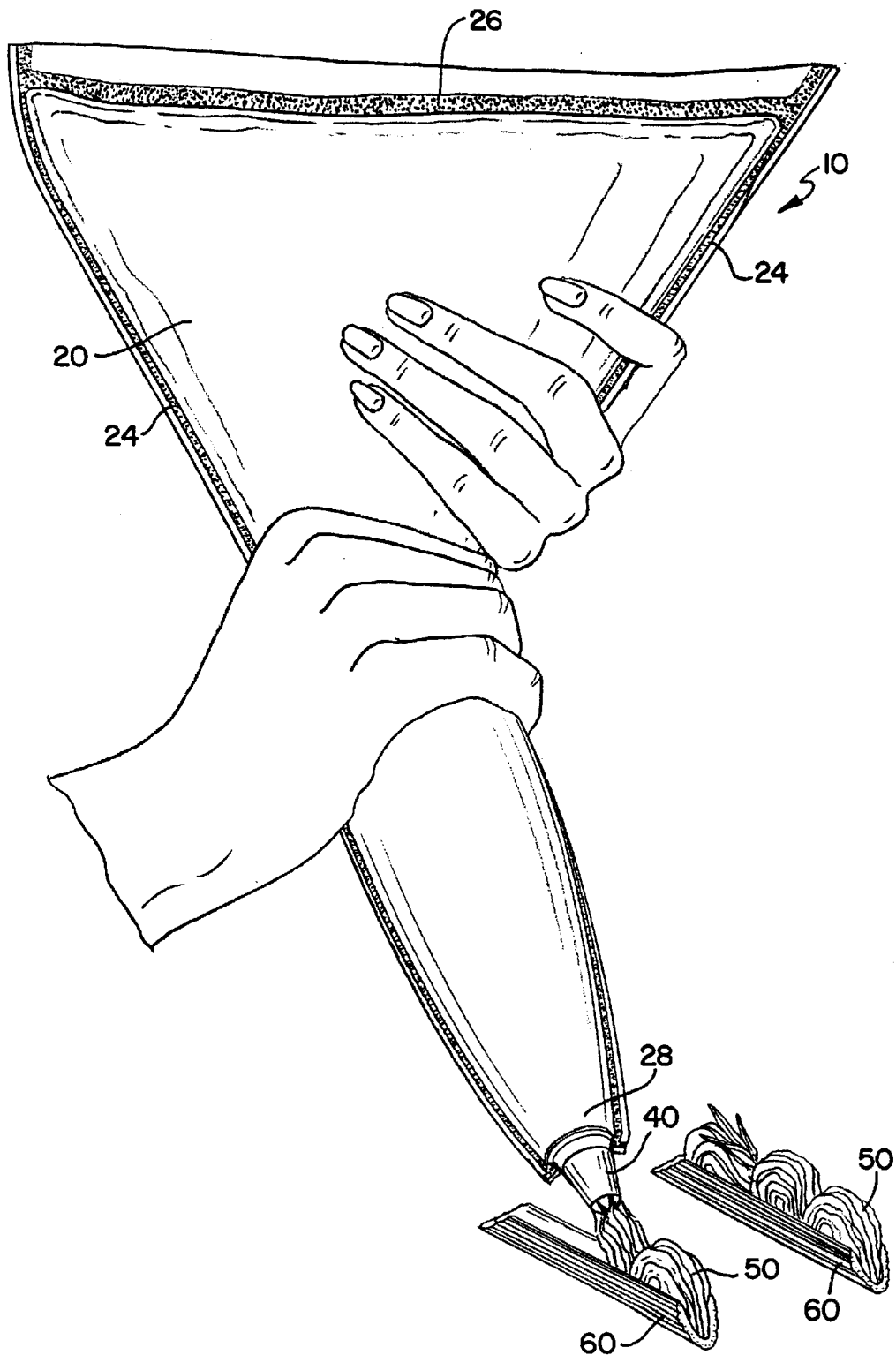
FIG. 1 is a perspective view during use of the preferred packaged cheese product for which the present invention is particularly well suited.

A preferred packaged cheese product 10 to which the present invention is specially adapted is shown in FIG. 1. The cheese product 50 is packaged for extrusion into decorative shapes, such as onto celery sticks 60 as shown in FIG. 1. The packaged cheese product 10 includes four main components: a container, preferably a pouch 20, a decorator tip 40, the cheese product 50, and a cap 80, shown in FIGS. 7–9 and discussed below. The cap 80 can be supplied as a separate item, or can be supplied coupled to the decorator tip and sealed inside the pouch.

Figure 2:
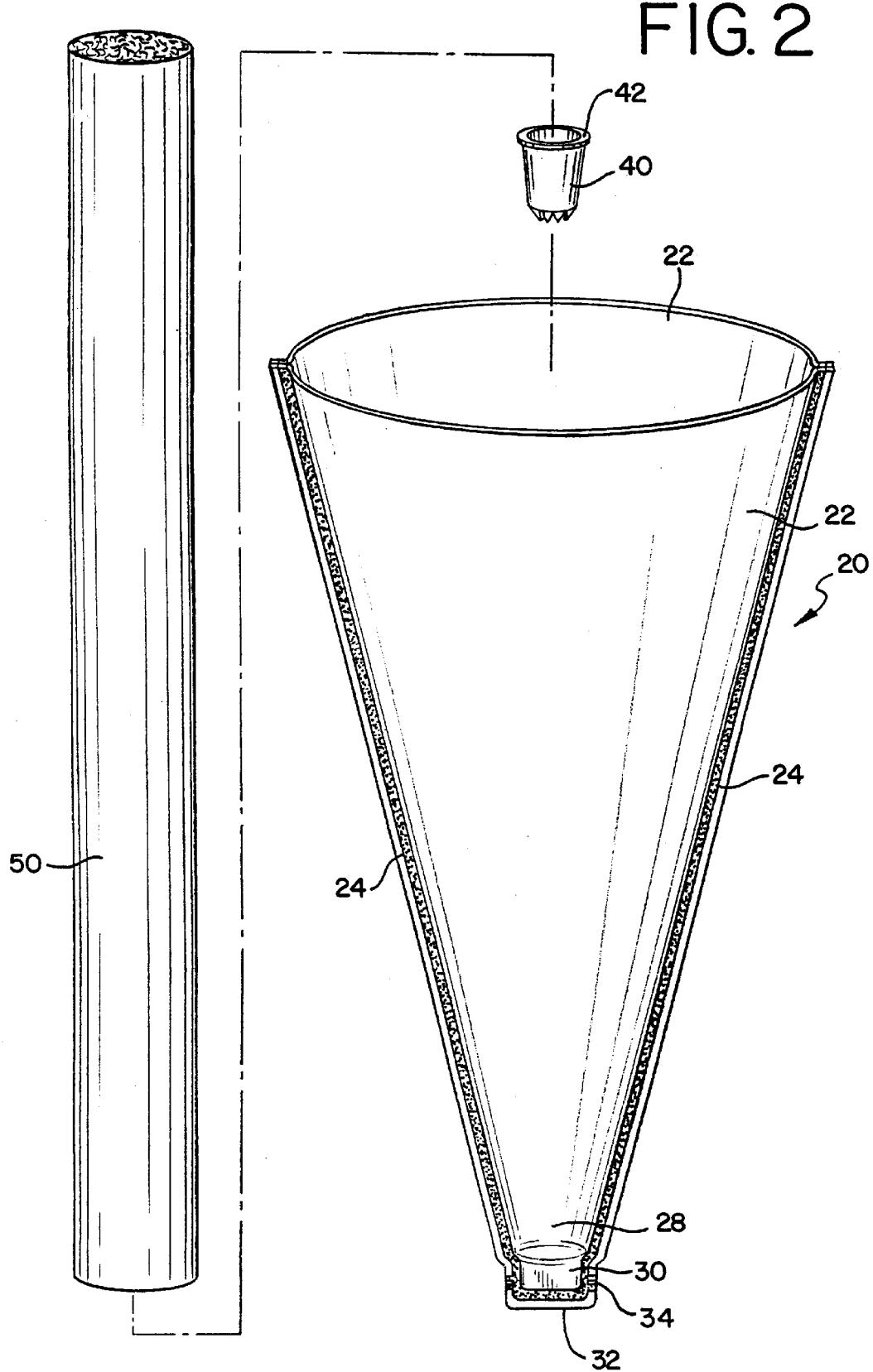
FIG. 2 is an exploded view of the packaged cheese product of FIG. 1 being assembled.

As shown in FIG. 2, the preferred container, pouch 20, is made from two layers of flexible material 22. As used herein, a "flexible material" is one which allows the amount of force generated by a typical human hand squeezing on the container made of the flexible material to cause extrusion of the product in the container out through an opening in the container. The pouch 20 is generally triangular in shape. While being filled the pouch 20 is formed into a cone. However, it would fold flat if it were empty, and is preferably made by sealing and die cutting two flat pieces of film on top of one another, or more preferably from one piece of film folded over on itself. The pouch is made by heat sealing the flexible material 22 around the periphery of the pouch, except for at the top. The pouch is then filled and hermetically sealed across the top. The flexible material 22 itself and the side seals 24 and top seal 26 have to be strong enough that the pouch will not bulge or burst when pressure is applied to the pouch 20 to force the cheese product 50 out through the decorator tip 40, as depicted in FIG. 1.

Figure 3:
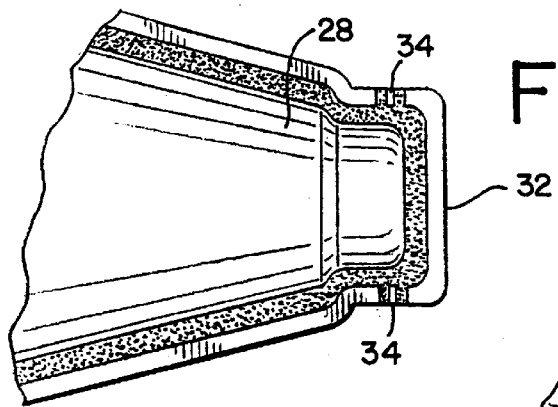
FIG. 3 is a plan view of the sealed corner of the packaged cheese product of FIG. 1.
Figure 4:
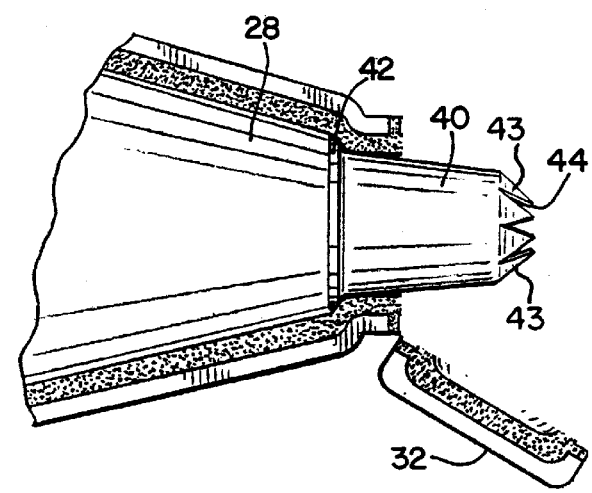
FIG. 4 is a plan view like FIG. 3 showing the decorator tip seated in the cut-off corner.

The pouch 20 initially has one corner 28 sized and shaped so that the decorator tip 40 will seat in an opening formed by cutting off the corner of the pouch 20, as shown in FIGS. 3 and 4. Preferably corner 28 has an elongated neck portion 30 with substantially parallel sides terminating in an end 32 with rounded corners. The shape of the elongated neck portion 30 provides some leeway in where the corner 28 may be cut to form the opening. It can be imagined that if the corner 28 had angular sides, the size of the opening would be dependent on where the corner 28 was cut. If the cut were made too high up on the pouch, the opening would be too big, and the decorator tip 40 might be forced out upon squeezing the pouch 20. If the opening were too small, not enough of the decorator tip 40 would come out of the pouch to allow the tip to function properly. Since the pouch is designed to be opened by end users who may not have used the product previously, or who may not be precise when cutting off the corner, it is helpful to provide this leeway.

Preferably the pouch 20 includes indicia 34 showing where the pouch 20 should be cut to form the opening in which the decorator tip 40 will seat. In the preferred embodiment the indicia 34 is made by heat sealing marks into the flexible film 22 at the same time the side seals 24 are made (FIG. 3). The combination of the elongated neck portion 30 and the indicia 34 helps to assure that the decorator tip 40 will properly seat every time a new pouch 20 is opened.

The decorator tip 40 is preferably made of plastic and is disposable, so that it may be thrown away with the empty pouch. The decorator tip 40 is preferably supplied with the pouch in an associated form facilitating the desired method of coupling the tip to the pouch. Most preferably the decorator tip is placed inside the pouch 20 before the cheese product is added, as shown in FIG. 2, such that the tip 40 is located adjacent the elongated neck portion 30 so that it can be seated in place after corner 28 is cut. Alternatively, an adaptor, shown in FIG. 5 and described below, could be sealed into the pouch. Most preferably, the cap 80 (described below) will be in place on the decorator tip 40 when the tip is placed inside the pouch 20.

The preferred decorator tip 40 has a shoulder 42 which helps seat the tip in an opening made in pouch 20. Also, the end of the tip 40 is made with a decorative opening 44 formed by petals 43 with slots between them. In the embodiment shown the opening 44 will make sharp ridges in the perimeter of the cheese product extruded through the tip. Of course other tip opening shapes could be used, depending on the desired decorative effect the cheese product 50 is to have. For example, the most common decorator tips include drop flower tips, leaf tips, petal tips, round tips, straight ribbon tips, curved ribbon tips, open star tips, closed star tips, star-cut cross tips, Irish heart tips, flat lettering tips, multiple star tips, other multiple opening tips, and basket weave tips. Preferably the opening in the decorator tip will have corners with angles of less than 90°. The preferred decorative shape that the cheese product will have once extruded through the decorator tip 40 will include grooves, ridges and/or peaks that are sharp and distinct. This is partly a function of the tip used, and partly a function of the consistency of the cheese product 50.

The cheese product 50 is preferably a cold pack cheese food made from cheddar cheese or a Neufchatel cheese based product. It will preferably include flavorings and other ingredients to provide the appropriate body and texture to the cheese product. Of course many different cheeses could be used to make the cheese product 50. The packaged cheese product will be soft enough to be extrudable yet will retain its shape once extruded and held at room temperature. It is preferred that the packaged cheese product will be ready for extrusion after being removed from the refrigerator for only a few minutes, such as 6–10 minutes. Preferably the cheese product 50 will have a consistency such that the cheese product, when it is at 35° F., can be extruded through the decorator tip 40 by applying pressure to the outside of the pouch without bursting the pouch. Also, once extruded into decorative shapes the cheese product 50 will preferably retain the decorative shape imparted by being extruded through the decorator tip 40 for a period of at least one hour at 80° F.

Preferred cold pack cheese food is made from sharp cheddar cheese. The finished product preferably has a pH of between about 4.7 and about 5.3, a moisture content between about 40% and about 44%, and a fat content between about 23% and about 30%. For Neufchatel cheese based products, the products will preferably have a pH of between about 4.6 and about 5.2, a moisture content between about 60% and about 66%, and a fat content between about 20% and about 26%.

For food service uses, the preferred packaged cheese product 10 contains about 1 to about 3 pounds, and more preferably about 1½ to about 2½ pounds, and most preferably about 2 pounds of cheese product 50. This package can then be used to make a large quantity of garnished food products, yet the pouch is not so large and heavy that it is difficult for the chef to handle it. When the pouch is first being used and is quite full, the chef will twist the bag in the center, as he would a pastry bag. The part of the cheese product being extruded is then forced into the end of the pouch near the tip. The remainder is retained in the top part of the pouch by heat seal 26, and rests on the back of the chef's hand.

For home or other retail uses, the packaged cheese product will preferably contain about 8 ounces to about 16 ounces, and most preferably about 12 ounces of cheese product 50.

The cheese product is preferably packaged under conditions such that the package has a shelf life, in an unopened and refrigerated state, of at least three months, and more preferably four months or longer. One method of packaging the cheese product 50 is to extrude it out of a metering device such as a piston filler which forms the cheese into a cylindrical form having a two-inch diameter as shown in FIG. 2. The cheese product may then be extruded into a pouch 20 which is still open at the top. As the cylindrical cheese product reaches the corner 28 of the pouch, the column of cheese 50 will start to deform to fit the shape of the pouch. When the desired amount of cheese product has been metered out, the cylindrical extrusion will be cut off and the cheese product will settle into the pouch. The open top is then heat sealed across its width.

The preferred flexible material 22 is a plastic film approved for food packaging. It is also preferable to use a printable film so that the packaged cheese product 10 can easily have required packaging information and desired labels and markings applied. A preferred film is a biaxially oriented nylon of about 100 gauge with a heat seal layer of linear low density polyethylene of about 2 mils thick laminated thereto. Any desired printing can be added to such a film by printing in reverse on the inside of the nylon film and then having the heat seal layer applied over the printing. If printing is applied to the film, and there is good registration between the printing and the heat seals 24 and 26, the indicia 34 of where the corner 28 is to be cut may be provided by a printed line.

With some cheese products it may be preferable to add a non-stick agent to the inside surface of the flexible material 22 that contacts the cheese product 50. This will help the cheese product to all be expelled from the pouch. The non-stick surface may be made by adding glycerol mono stearate to the inside surface, such as to the heat sealable layer.

Figure 5:
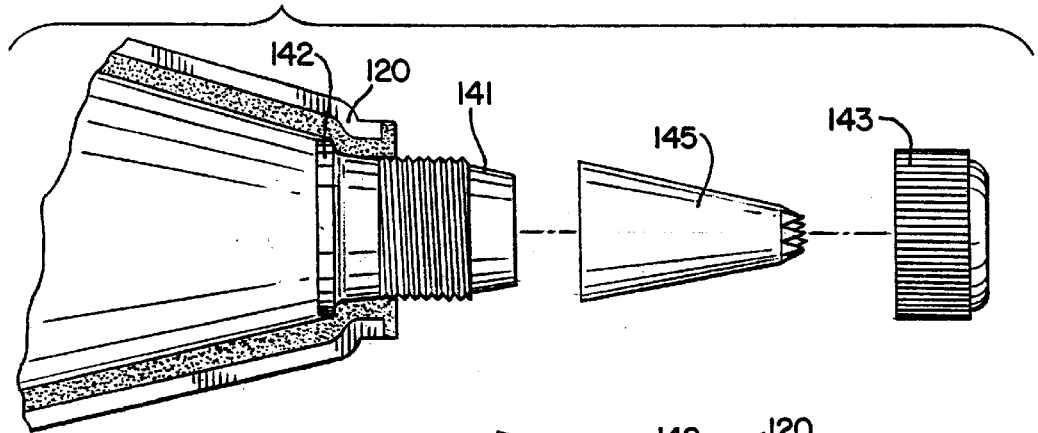
FIG. 5 is partially exploded view of a second embodiment of a packaged cheese product for which the present invention is well suited.
Figure 6:
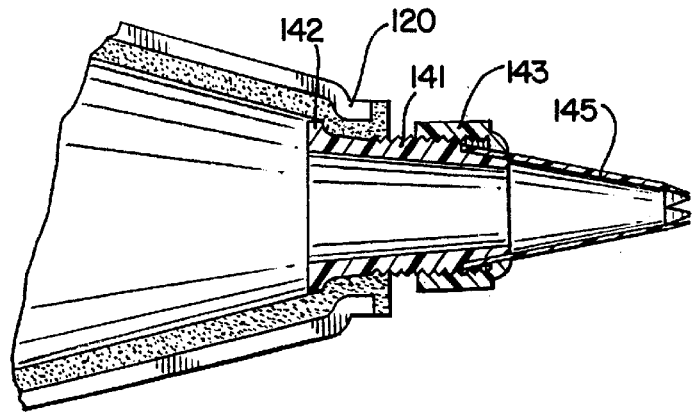
FIG. 6 is a partial cross-sectional view of the packaged cheese product of FIG. 5.

A second embodiment of the invention is depicted in FIGS. 5 and 6. The packaged cheese product of FIG. 5 is very similar to that of FIG. 1, except that instead of a decorator tip being placed in the pouch, an adaptor 141 onto which a decorator tip can be attached is sealed in the pouch 120. The adaptor 141 has a shoulder 142 which helps seat the adaptor in the opening made by cutting off one corner of the pouch 120, just as shoulder 42 helps seat decorator tip 40. When the pouch 120 is opened, the adaptor 141 is forced to extend out of the opening and the decorator tip 145 is attached to the threaded end of the adaptor 141 with a retaining nut 143. With this alternative embodiment, a series of different shaped tips 145 could be supplied, and the user could pick the tip 145 to make the shape most suitable for the food item being garnished. However, the pouch 120 and the adaptor 141 are still designed to be closed by a cap (not shown) when partially used, and then disposed of when pouch 120 is empty.

Figure 7:
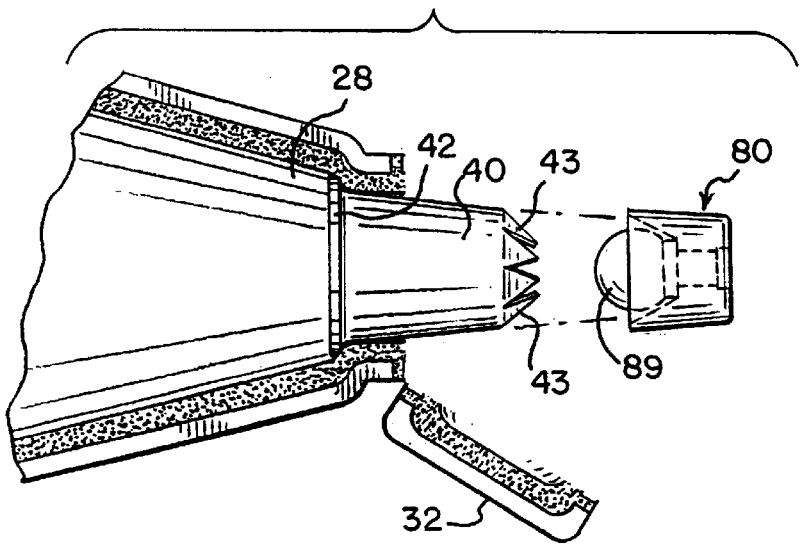
FIG. 7 is a plan view like FIG. 4 showing the cap of the present invention in relation to the decorator tip.
Figure 8:
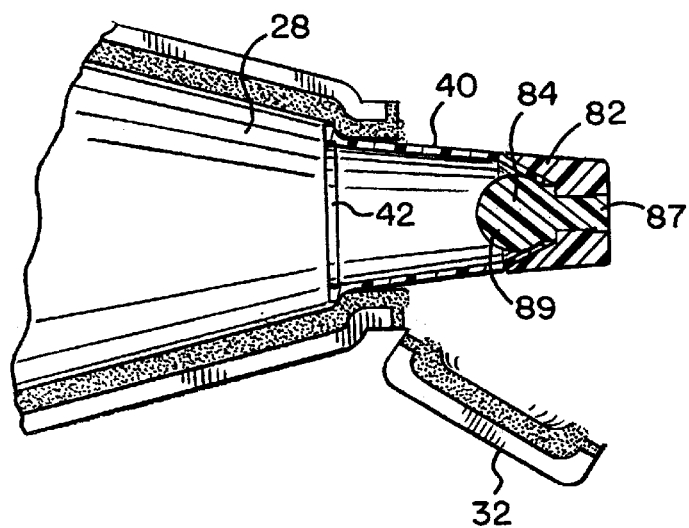
FIG. 8 is a partial cross-sectional view showing the cap in place on the decorator tip of FIG. 7.
Figure 9:
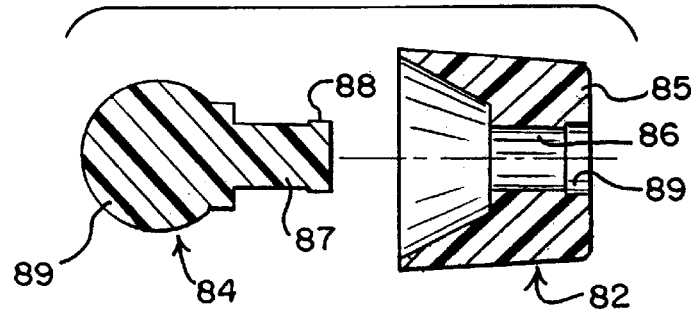
FIG. 9 is an exploded cross-sectional view of the cap of FIG. 7.

The cap 80 used to close the tip 40 between uses is shown in FIGS. 7–9. The preferred cap 80 is designed for closing a decorator tip having petals 43 with slots between them. Other cap shapes may be preferred if the decorator tip has a different opening shape. The cap 80 is preferably made from two separate pieces, a skirt member 82 and a bulb member 84. The skirt member 82 has a base 85 with a hole 86 through it. The bulb member 84 has a shank 87 on it, with an enlarged end 88 designed to mate with an enlarged section 89 of hole 86. The skirt member 82 and bulb member 84 are connected by putting the shank 87 in the hole 86. The bulb member 84 protrudes outwardly of the skirt member. When assembled, the skirt member 82 and the bulb end 89 define a space between them in which the petals 43 of the decorator tip 40 may be held. The skirt member has a generally frustoconical inside surface. The bulb member 84 has a generally spherical bulb end 89 extending from the shank 87. The bulb end 89 is sized to fit within the decorator tip 40. The cap is held in place because the petals 43 deflect outwardly as the bulb end 89 is pushed inside, and then the petals 43 close behind the bulb end 89. The frustoconical inside surface of the skirt member 82 covers the slots between the petals to thereby close the decorator tip. The outside surface of the skirt member is also generally frustoconical, although the surfaces on the inside and outside of the skirt are not parallel.

The preferred inside frustoconical shape of the skirt member forces the petals 43 to return to their original shape after the bulb end 89 is forced into the opening 44 of the decorator tip 40. The outside frustoconical shape helps to guide the cap and decorator tip combination out of the pouch when the pouch is first opened.

Because the packaged cheese product 10 will be used by many different people under different conditions, it is important that the cheese product 50 consistently have the correct consistency. Since the basic cheese ingredients used to make the cheese product 50 inherently have lot-to-lot variations, it is important to have tight product characteristic criteria and manufacturing procedure tolerances when making the cheese product 50.

EXAMPLES

Example 1

Three-hundred pounds of Sharp Cheddar Cold Pack Cheese Food with desired decorating properties were prepared in a Silent Cutter (Seydelmann-Stuttgart, Model No. K324 U-VA 87188-1). The ingredients used were as follows:

| Ingredients | Weight |
| --- | --- |
| Sharp Cheddar Cheese | 198 lbs. |
| Concentrated Milkfat | 16.0 lbs. |
| Whey Protein Concentrate | 11.0 lbs. |
| Delactosed Whey | 23.5 lbs. |
| Salt | 1.45 lbs. |
| Sorbic Acid | 200 grams |
| Guar Gum | 143 grams |
| Annatto Color | 255 cc |
| Lactic Acid | 700 cc |
| Water | 48.2 lbs. |
| Total | 300 lbs. |

The mixture was chopped at high mixing speed in the Silent Cutter. Cutting was continued until the product was smooth, slightly shiny, and completely homogeneous. The finished product had the following properties:

| Moisture | 42.50% |
| --- | --- |
| Fat | 26.0% |
| Salt | 2.6% |
| pH | 5.09 |

The finished cheese was filled into a 2 lb. triangular shaped plastic pouch with a decorator tip inserted. The pouch was top-sealed with a band sealer. The finished cheese had a smooth and creamy body/texture with a uniform color, and could be extruded out of the tip without much force at a refrigerated temperature (35° F.). The cheese product was also able to retain its decorative shape throughout the catering process at room temperature. A cap could be affixed to the tip before the tip is sealed in the pouch, or a cap could be provided with the sealed pouch.

Example 2

A horseradish flavored cold pack cheese food with desired decorating properties was prepared in the same manner as described in Example 1. The ingredients used were the same as Example 1 with the exclusion of Annatto color and the addition of horseradish flavors (41 cc). The finished cheese composition had the following properties:

| Moisture | 42.88% |
| --- | --- |
| Fat | 27.0% |
| Salt | 1.80% |
| pH | 4.97 |

The finished decorator cheese was packaged in a one-pound triangular shaped plastic pouch with decorator tip inserted. Again, a cap could be included with the tip inside the pouch or supplied separately.

Example 3

A smoked Cheddar flavor cold pack cheese food with desired decorating properties was prepared in the same manner as described in Example 1 with the addition of 355 cc smoke flavor to the blend mixture.

The finished cheese composition had the following properties:

| Moisture | 41.3% |
| --- | --- |
| Fat | 28.5% |
| Salt | 2.00% |
| pH | 4.95 |

The finished decorator cheese was packaged in a 12 oz. triangular shaped plastic pouch with decorator tip inserted. A cap could be provided to seal the tip after partial use of the product.

Example 4

Ten pounds of Neufchatel cheese with added herb and garlic flavor seasonings were made in the Silent Cutter (Hobart Model 84186). The formula contained the following ingredients:

| Ingredients | Weight |
| --- | --- |
| Neufchatel cheese | 9.82 lbs. |
| Salt | 13.62 grams |
| Sorbic Acid | 6.60 grams |
| Guar Gum | 4.70 grams |
| Herb and Garlic Seasonings | 59.0 grams |
| Total | 10.00 lbs. |

The mixture was cut at high mixing speed until the blend became smooth, slightly shiny, and completely homogeneous. The finished Neufchatel cheese with herb and garlic flavor seasonings had the following properties:

| | |
| --- | --- |
| Moisture | 61.55% |
| Fat | 22.0% |
| Salt | 1.54% |
| pH | 4.78 |

The finished cheese was packaged in a 1 lb. triangular shaped plastic pouch with decorator tip inserted. The finished cheese had clean, moderate garlic and pepper flavors with a smooth and creamy body/texture, and could be extruded out of the tip without too much force needed after the product was refrigerated at 35° F. The Neufchatel-based finished cheese product, which does not meet any particular standard of identity, was able to retain its decorative shape throughout the catering process at room temperature. A cap could be supplied affixed to the tip in the pouch or separately with the pouch.

Even though the above examples disclose decorative cheese products with fat levels consistent with traditional cheese products, reduced fat, low fat and fat free decorative cheese products are contemplated in the present invention. For example, fat free cream cheese can be used to make a fat free decorative cream cheese based product. Reduced or low fat cheddar cheese can be used to make a decorative cheese product similar to a cold pack cheese but with reduced fat.

The preferred packaged cheese products of the present invention have many advantages. The product already has the decorator tip or an adaptor therefor inside the pouch, so that the product can simply be removed from the refrigerator, kneaded for a few minutes and the corner of the pouch cut off. The chef is then ready to start piping. There is no time-consuming mixing and loading a cheese product into a pastry bag, and no messy pastry bag to be cleaned later. The preferred cheese product is not a processed cheese, but is rather a cold pack cheese food or a Neufchatel cheese based product. Because it is hermetically sealed, the product has a long shelf life. If the entire pouch is not used, the cap can be used to close the opening in the decorator tip, which can then be left protruding from the cut corner of the pouch, and the pouch put back into the refrigerator, the heat seals 24 and 26 keeping the main part of the pouch sealed.

The preferred packaged cheese product of the present invention is particularly well suited to serve the needs of food service users, including hotels, caterers, restaurants, hospital or other health care facilities and other establishments that have a kitchen staff and prepare large quantities of food for service to dozens or even hundreds of people at one time. The product is manufactured in large quantities (taking advantage of economies of scale), packaged in quantities usable in a short amount of time in a food service setting, distributed to such food service users via normal commercial distribution systems, and then used by such food service users directly from the package in which it was shipped to form decorative cheese garnish on food items. The product is preferably made under quality control conditions such that even after the amount of time required for commercial distribution of the packaged cheese product, the cheese product will still be extrudable, yet it will retain its decorative shape, when the end user is ready to use it. The preferred cap can close the decorator tip by the bulb member being held in by the petals 43, while the skirt member 82 reshapes the petals and keeps them from deforming during storage. The bulb member 84 is preferably made out of a hard plastic.

It should be appreciated that the present invention is capable of being incorporated in the form of a variety of embodiments, only a few of which have been illustrated and described above. For example, the cap may be used to close a decorator tip on other extrudable food packages, such as frosting, and even non-food packages. When the food comprises a cheese product, processed and imitation cheese products could be used. Instead of a pouch, a semi-rigid tube could be used as the container, as long as it was made of a flexible material allowing hand squeezing force to extrude the product. Rather than placing a decorator tip or adaptor in the pouch, a decorator tip could be provided that could attach to the pouch or be used with the pouch in some other fashion, such as by piercing a hole in the pouch and using barbed fittings to hold the decorator tip to the pouch. The cap could be made of one piece, rather than molded as two pieces and snapped together. The invention may thus be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A cap for closing a decorator tip having petals with slots between them comprising:

a) a skirt member having a generally frustoconical inside surface;

b) a generally spherical bulb member within the skirt member, the bulb member being sized to fit within the decorator tip; and c) the skirt member and bulb member defining a space therebetween in which the petals of the decorator tip may be held, the skirt covering the slots between the petals to thereby close the decorator tip.

2. The cap of claim 1 wherein the skirt member and bulb member are molded as two separate pieces connected together to form the cap.

3. The cap of claim 2 wherein the skirt member has a base with a hole through it, the bulb member has a shank on it, and the skirt member and bulb member are connected by putting the shank into the hole.

4. The cap of claim 1 wherein the skirt member also has an outside surface which is generally frustoconical.

5. The cap of claim 1 wherein the bulb member protrudes outwardly of the skirt member.

6. A food package with a decorator tip and cap comprising:

a) a container comprising flexible material;

b) a food product within the container;

c) a decorator tip having a decorator opening for extruding the food product out of said opening in a decorator shape; and d) a cap on the decorator tip closing said opening, the cap and tip being coupled together and both inside of said container.

7. The food package of claim 6 wherein the food comprises a cheese product.

8. The food package of claim 6 wherein the decorator tip has flexible petals with slots in between them and the cap includes a bulb member and a skirt member, the cap being held in place by the bulb member being behind the petals and the skirt member covering the slots.

9. The food package of claim 6 wherein the container has a corner sized and shaped so that the decorator tip will seat in an opening formed by cutting the corner off of the container.

10. The food package of claim 6 wherein the package is hermetically sealed.

11. A packaged decorator cheese product comprising:

a) a container comprising flexible material;

b) a decorator tip attached to the container, the tip having flexible petals;

c) a cheese product inside the container; and d) a cap having a rigid bulb member and a skirt member, the bulb member being sized to fit inside the tip and the skirt member covering the outside of the petals.

12. A method of opening a food container and reclosing the container after dispensing food in decorative shapes therefrom comprising the steps of:

a) providing a container made of flexible material with a food product and a decorator tip inside of the container;

b) making an opening in the container and forcing the decorator tip so that a front end thereof protrudes out of the container opening, the decorator tip having a back end that keeps the decorator tip from being expelled out of the opening;

c) forcing the food product out of an opening through the decorator tip so that the food product is formed into a decorator shape; and d) capping the opening of the decorator tip with a cap that has a bulb member that fits within the decorator tip opening.

13. The method of claim 12 wherein said cap and tip are coupled together in the container and the front end of the tip is capped at the time it is first forced out of the opening made in the container.

14. The method of claim 12 wherein the decorator tip opening is formed by flexible petals with slots between them and the cap further includes a skirt member surrounding the bulb member, the bulb member being held within the decorator tip opening by the elastic petals and the skirt covers the slots between the petals.

* * * * *

UNITED STATES PATENT AND TRADEMARK OFFICE
CERTIFICATE OF CORRECTION

PATENT NO. : 6,153,238　　　　　　　　　　　　　　　　　　　　　　　Page 1 of 1
DATED : November 28, 2000
INVENTOR(S) : Daniel P. Shannon It is certified that error appears in the above-identified patent and that said Letters Patent is hereby corrected as shown below:

Title page,
Column 2,
Line 6, under "OTHER PUBLICATIONS", change "Top™" to -- Top® --.
Under "ABSTRACT", change "cuffing" to -- cutting --.

Signed and Sealed this

Fourth Day of December, 2001

Attest:

*Nicholas P. Godici*

NICHOLAS P. GODICI
*Attesting Officer*　　*Acting Director of the United States Patent and Trademark Office*